INVENTORS
T. B. WESS
R.A. KROC

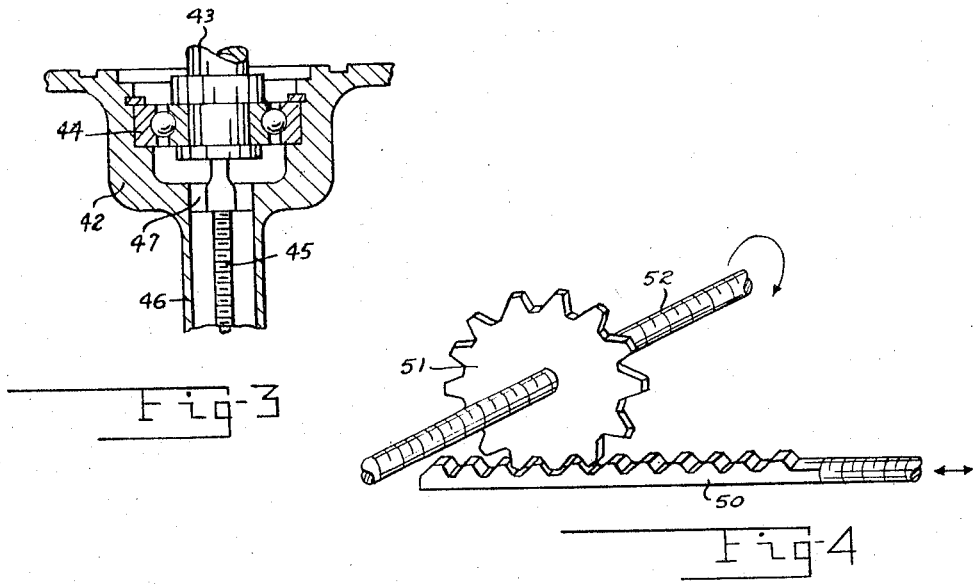
Fig-3
Fig-4
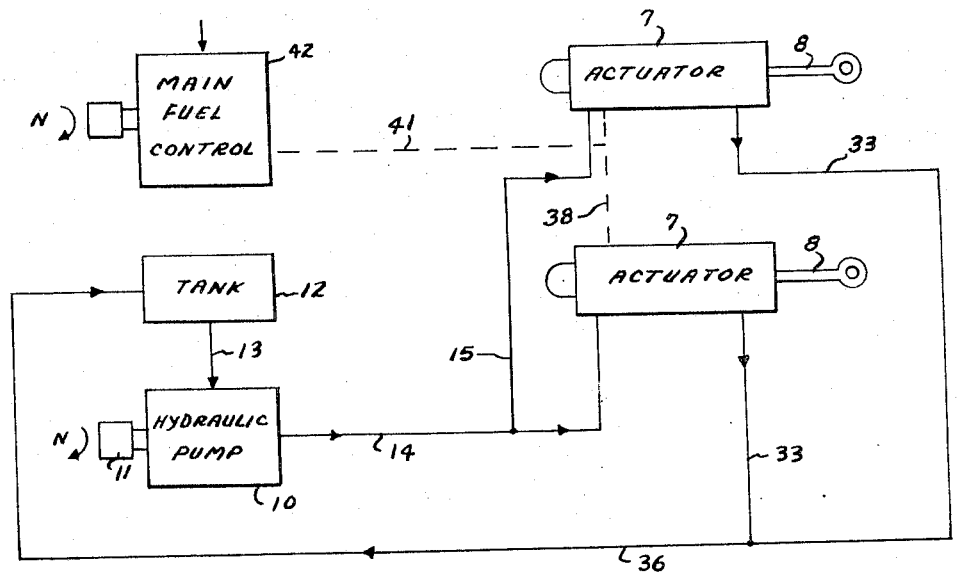
Fig-5
INVENTORS
T. B. WESS
R. A. KROC
BY
ATTORNEYS

INVENTORS
T.B. WESS
R.A. KROC

BY Harry A. Herbert Jr
and Charles H. ...
ATTORNEYS

United States Patent Office 3,296,936
Patented Jan. 10, 1967

3,296,936
FLUID MOTOR ACTUATORS
Thomas B. Wess, Cincinnati, and Richard A. Kroc, Mason, Ohio, assignors to the United States of America as represented by the Secretary of the Air Force
Filed Nov. 25, 1964, Ser. No. 414,037
10 Claims. (Cl. 91—49)

This invention relates to hydraulic actuators and more particularly to the field of nozzle actuator control and synchronization, compressor stator actuator control and synchronization, and other similar jet engine variable position control systems, having for an object the provision of actuators which are lighter and more efficiently and accurately synchronized and cooled.

A further object is the provision of a plurality or group of hydraulic actuators connected for simultaneously controlling and adjusting a movable part, for instance, of a gas turbine jet engine such as the variable area jet nozzle thereof, or adjustable stators or stator blades of the compressor of the engine, in which a high pressure hydraulic fluid flow is employed to synchronize the adjusting movements of the actuators and also to efficiently cool the same during the operation thereof.

A further object of the invention is the provision of an associated group of similar extensible actuators adapted to be connected for simultaneous actuation of a common adjustable part in which each actuator has a variable ported area piston therein within a cylinder in which hydraulic fluid under pressure is continuously circulated through the piston to selectively vary the differential pressures on the opposite sides of the piston for moving the same with a flow of the circulated pressure fluid through the piston cooling the actuator, and the provision of mechanical means in the fluid circulating system for simultaneously adjusting the variable ported area in the pistons to vary the differential fluid pressures on the opposite sides of the pistons.

A further object includes a "feed back" system whereby the movement of the pistons in the actuators readjusts the size of the ported areas through the pistons independently of the mechanical means, in proportion to the differential pressures of the system fluid at the opposite sides of the pistons to again bring the differential pressures in balanced relation.

A further object is the provision of a hydraulic actuator system in which fluid under varying pressures is utilized for actuating and cooling the actuators which fluid does not enter the main mechanical control means for controlling or adjusting the extended or retracted positions of the actuators, and thus permits the use of a circulating pressurized fluid actuating system that is easier, more efficient, and more accurate in synchronizing the movement of the actuators than would be the case if the same pressurized fluid medium was employed to adjust the main control means for varying the ported area in the pistons and also employed to provide the pressure for moving the pistons to extend or retract the actuators.

A further object is the provision of a plurality of piston type extensible actuators for simultaneous operation in synchronized relation which includes means for introducing hydraulic fluid at a predetermined pressure into a plurality of cylinders at one side of an actuator piston in each cylinder at a uniform predetermined restricted rate of flow, discharging said pressurized fluid through said pistons to the other sides thereof at an adjustably regulated rate of flow, and discharging said fluid from the cylinders at that side of the pistons at a predetermined restricted rate of flow to provide opposed hydraulic pressures at opposite sides of the pistons, and a piston rod actuator extending through one end of each of the cylinders remote from the restricted fluid outflow ends to provide differential pressure areas on the opposite sides of the pistons for moving said pistons in proportion to said differential pressures, including adjustable valve means in said pistons for varying the ported area through the pistons incident to relative movement of the valve means, and relative follow-up movement of the pistons, whereby a variation in the ported areas in the pistons controls the pressure drop through each of the pistons to vary the differential pressures at opposite sides of the pistons for moving the same in the cylinders, and the inclusion of a common mechanical control means connected to the valve means in all of the pistons for simultaneous shifting of the valve means to change said pressure drop through the pistons.

A further object includes a constant flow variable pressure fluid supply means for supplying pressure to one end of the cylinders at high pressure and lower fluid pressure return means connected to the opposite ends of the cylinders for returning the pressure fluid back to the high fluid pressure supply means, in which said mechanical means for adjusting the valve means in all of said pistons extend through said lower pressure fluid return means and is connected to said valve means for adjusting the pressure drop therethrough.

A further object is the provision of a hydraulic system for synchronized actuation of a plurality of extensible actuators which include a constant flow variable pressure pumping supply and control system which generates an amount of heat which is in proportion to the load conditions and prevents stagnation of the hydraulic fluid during the operation of the system and provides an accurate linear feed back control during actuation of the actuators to produce synchronized movement of the actuators, in which the pressurized fluid for adjusting the extension and retraction of the actuators also constitutes means for cooling the actuators during operation thereof.

A further object of the invention is to provide improved means to synchronize a plurality of hydraulic actuators for uniform motion of the actuator rods to minimize mechanical distortion of the actuator mechanism in the presence of unequal external loads imposed on the actuators themselves.

Other objects and advantages of the invention will become apparent from the following description and accompanying drawings in which like reference characters refer to like parts in the several figures.

FIG. 1 is a somewhat diagrammatic sectional view of a synchronized control system including four extensible power actuators and a main mechanical adjustment control means therefor, some parts thereof being shown schematically or in section, and comprising an arrangement of the actuators for the purpose of actuation or adjustment of the area of a nozzle of a gas turbine jet engine, or for controlling the adjustment of gas turbine compressor stator blades.

FIG. 2 is an enlarged fragmentary longitudinal sectional view through one of the high pressure hydraulic actuators similar to those shown in FIG. 1, illustrating the details of construction of one form of the invention, parts being broken away to foreshorten the view, and disclosing one embodiment of the invention, it being understood that in practice more than one actuator (as seen in FIG. 1) is usually employed.

FIGS. 3 and 4 illustrate details of construction which may be employed if desired as mechanical control means to adjust the positions of the valves in the pistons of the actuators, to adjust the pressure drop through the pistons.

FIG. 5 is a schematic or diagrammatic view of a system employing the invention, illustrating only two actuators.

Figure 1:
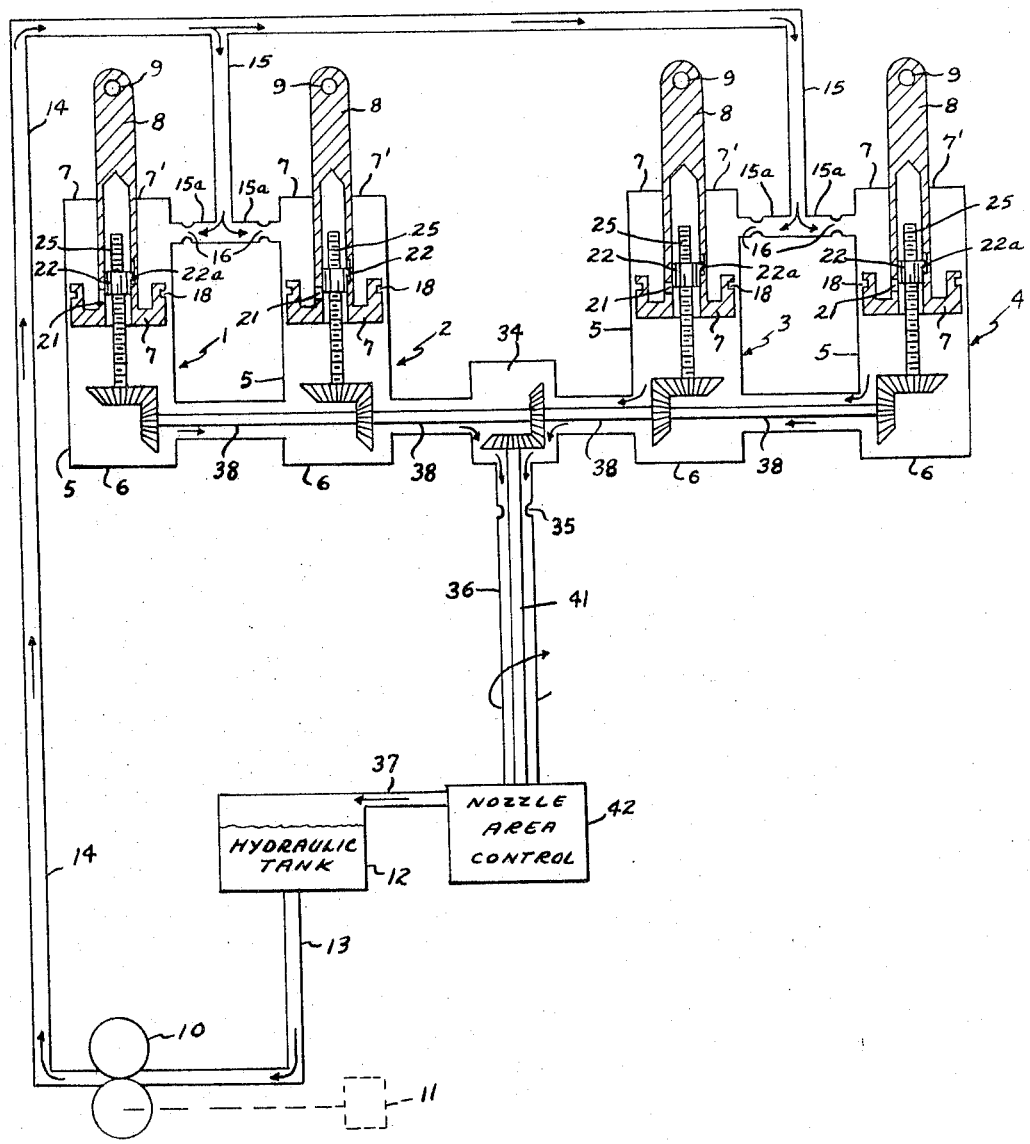

In the drawings, particularly in FIG. 1, the reference numerals 1, 2, 3 and 4 denote a plurality of four actuators embodying the invention, for instance actuators comprising cylinders 5 closed at their bottom or inner ends 6 with their top ends 7 having piston actuator rod guide openings 7' through which piston rod actuators 8 extend, suitable packing being provided to prevent fluid leakage between rods 8 and the ends 7.

The actuator rods 8 are provided with openings 9 at their outer ends whereby the same may be bolted or hinged to the actuated means for adjustment of the nozzles, or stators (not shown) for varying the nozzle area, or changing the inclination of the stator blades of the compressor.

Hydraulic fluid is supplied at a variable pressure and a constant rate of flow by a pump 10, for instance a gear pump driven by a suitable power source 11, the pump being supplied with hydraulic fluid from a suitable tank 12 through a supply conduit 13.

The pump 10 supplies fluid under variable pressure and constant flow rate through a high pressure fluid supply conduit 14, and branch conduits 15 which connect with conduits 15a leading into the upper ends of the actuator cylinders 5.

The conduits 15a each have similiar flow restrictions therein indicated at 16 to generate (provide) a predetermined pressure drop in the pressurized fluid entering the cylinders.

Figure 2:
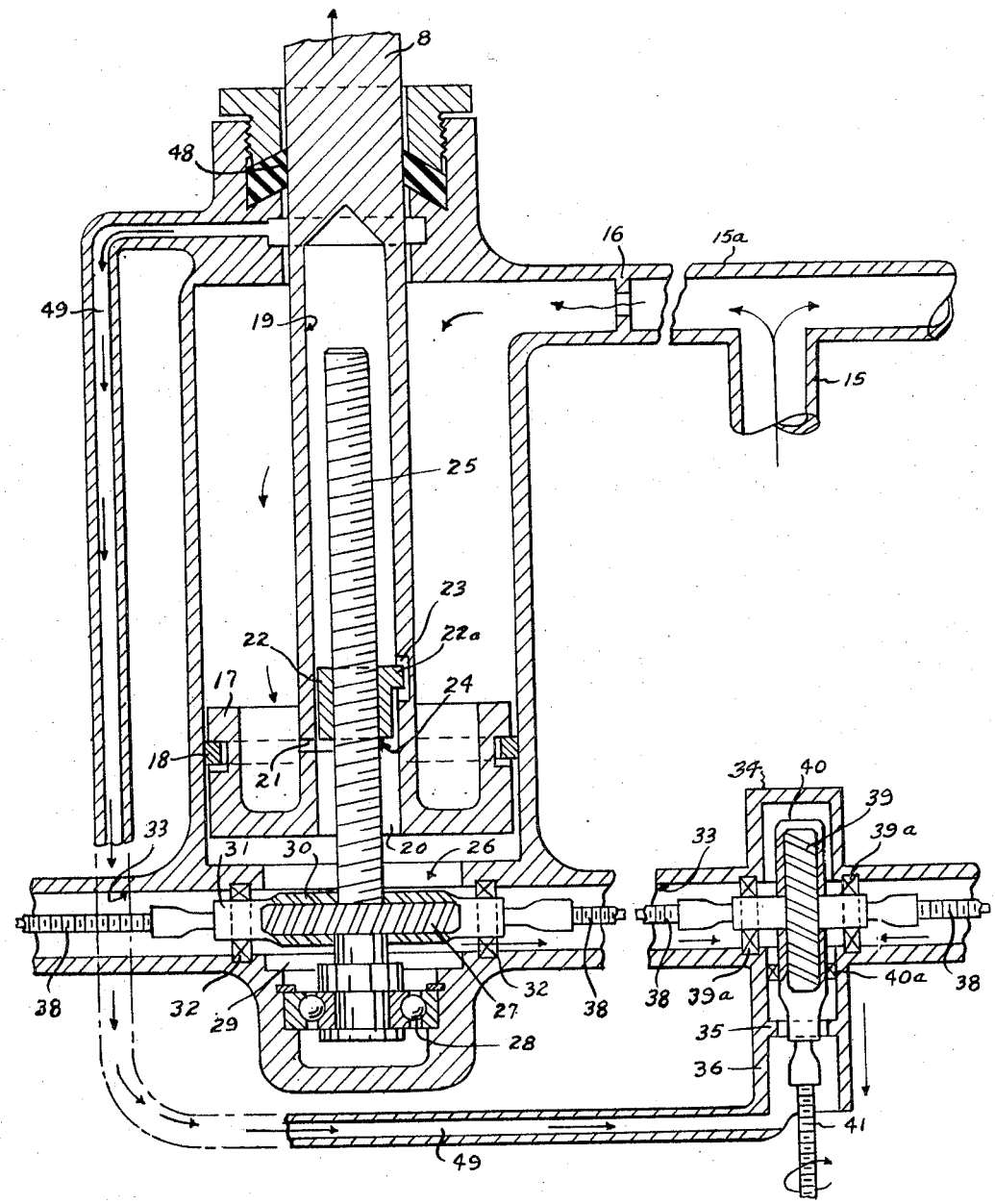

The piston structures, as best seen in FIG. 2, each comprise a piston head 17 connected to, or formed integrally with, the piston rod 8. The piston 17 having suitable piston rings 18 is provided with an elongated axial recess 19 opening out of the bottom of the piston head at 20.

A restricted passage extends through the wall of each piston rod adjacent the piston head 17 as indicated at 21, having a larger flow area than the restricted flow areas at 16, preferably being in the form of an elongated slot, extending partly around the wall of the hollow rod 8 perpendicular to the axis of the rod.

A control valve member 22 is mounted for limited axial movement in the central recess or bore 19 across the restricted flow opening 21 to vary the pressure drop of the fluid flow therethrough, the valve 22 having a lateral projection 22a movable in a longitudinal slot or groove 23 of predetermined length, to prevent relative rotation of the valve and limit the axial displacement thereof relative to the sides of the flow slot 21.

The central passage 19 in the piston rod 8 is preferably cylindrical and the valve member 22 is also cylindrical, having a suitable sliding fit in the bore 19.

The valve members 22 are each provided with a threaded passage 24 through which a threaded adjusting screw or stem 25 extends, projecting upwardly within the bore 19 to nearly the top or outer ends of the cylinders 5, the lower ends of the stems or screws 25 each projecting through an opening 26 into a chamber 29 in the lower end of the cylinder and having a worm wheel 27 fixed thereon with the lower or projecting extremity of the stem 25 journalled in suitable bearings 28 to prevent relative axial movement of the stem, while permitting the same to rotate freely.

As seen in FIG. 2 more particularly, the lower or inner ends of the cylinders are each provided with an annular recess or chamber 29 which carries the bearings 28 and the worm wheel 27. Located in this chamber 29 is a worm member 30 fixed on a shaft 31 which is suitably journalled at 32 in a fluid flow passage 33 in communication with lower or inner end of the cylinder 5 through the chamber 29 and opening 26.

From the above it will be seen that hydraulic fluid under pressure from conduit 15 will flow through the flow restriction 16 into the outer end of the cylinder 5 at the rod side of the piston 7 and will flow continuously through the adjustable flow opening 21 in the piston to the lower or inner end of the cylinder during the operation of the pump 10. The outflow from the cylinders 5 flows through the fluid return conduits 33 into a mechanical rotary output control member casing 34 (as seen in FIG. 1), flowing through a restricted opening 35 and back, under much lower pressure, through conduits 36 and 37 into the pressure fluid supply or storage tank 12.

It should be noted that the flow restricted area at 16 is preferably smaller than the area of the restriction 35 to provide a predetermined pressure drop between the supply conduit 15 and the lower pressure outflow conduit 36.

The circulated pressure fluid passing through the cylinders and pistons acts as a cooling medium for the nozzle actuators, as well as a lubricant, The worms 30 are connected by the actuating cables 38 which are connected in a gear box 34 to a worm wheel 39 which meshes with a worm 40, the worm wheel 39 being journalled in bearings 39a while the worm 40 is journalled in bearings 40a and is rotatably adjusted by a shaft or cable 41 extending through the conduit 36 into the nozzle area control box 42 (FIG. 1) through which the pressure fluid flows in its path back to the hydraulic fluid storage tank 12.

Any suitable means may be provided for rotative adjustment of the control cable 41.

The system is preferably designed for a predominant load to be acting against the rod sides of the pistons, that is, the actuator rods 8 are loaded in tension. This is a typical jet engine nozzle actuation system where the exhaust gases tend to blow the variable nozzles open. The actuators then pull the nozzles closed with their rods 8 in tension. To open the nozzles under most conditions, the rod pressure is reduced and the actuators throttle in their extension directions.

Under some conditions, such as the opening of a nozzle when the engine is shut down, a positive force is required at the head end equal to or exceeding the nozzle friction. To extend each actuator the control valve 22 is moved by rotation of the stem 25 toward the outer or rod end of the actuator by the common nozzle area control means 42. This causes the flow area through the slot 21 in the piston 17 to become larger than the restricted flow area through the restriction 16 in the supply or inflow conduit 15a. Under these conditions, the same pressure acting on the differential area of the piston (head area minus piston rod area) will cause the actuator to extend, this causing the nozzle to open.

The restricted outflow area through the restriction 35 in the main or common lower pressure fluid return conduit 36 is sized by determining the maximum load in the actuator extension. Knowing this load, the area is then sized to produce a pressure drop equal to this load divided by the piston differential area.

It is noted that the main mechanical control system is disposed in the lower pressure fluid return conduits, however, in the event of an electrical control it might be unnecessary to return the hydraulic fluid to the nozzle area conrtol 41 and the control cable 45 could be inserted directly in one of the actuators as seen in FIG. 3. In this case the base of the actuator cylinder, similar to 5, is indicated at 42 in this figure with the threaded adjusting stem for the valve 22, indicated at 43, being supported by suitable bearings 44, with the adjusting control cable 45 for the stem extending through the tubular support 46 containing a suitable electrical rotative adjustment control (not shown), pressure fluid seals 47 being provided to prevent pressure fluid leakage into the supporting conduit 46.

Referring back to FIG. 2, the pressure cylinders are, of course, provided with pressure fluid seal packing glands 48, and fluid return conduits 49 to accommodate fluid leakage and return the same to the conduit 36, downstream from the flow restriction 35. Should a push-pull control rod be desired, an arrangement such as shown in FIG. 4 may be employed in which a rack member 50 is adjusted by the main control means with the rack 50 rotating a gear 51 which rotates the screw stems 52 to adjust the axial positions of the control valve members 22 in the pistons 7.

Figure 6:
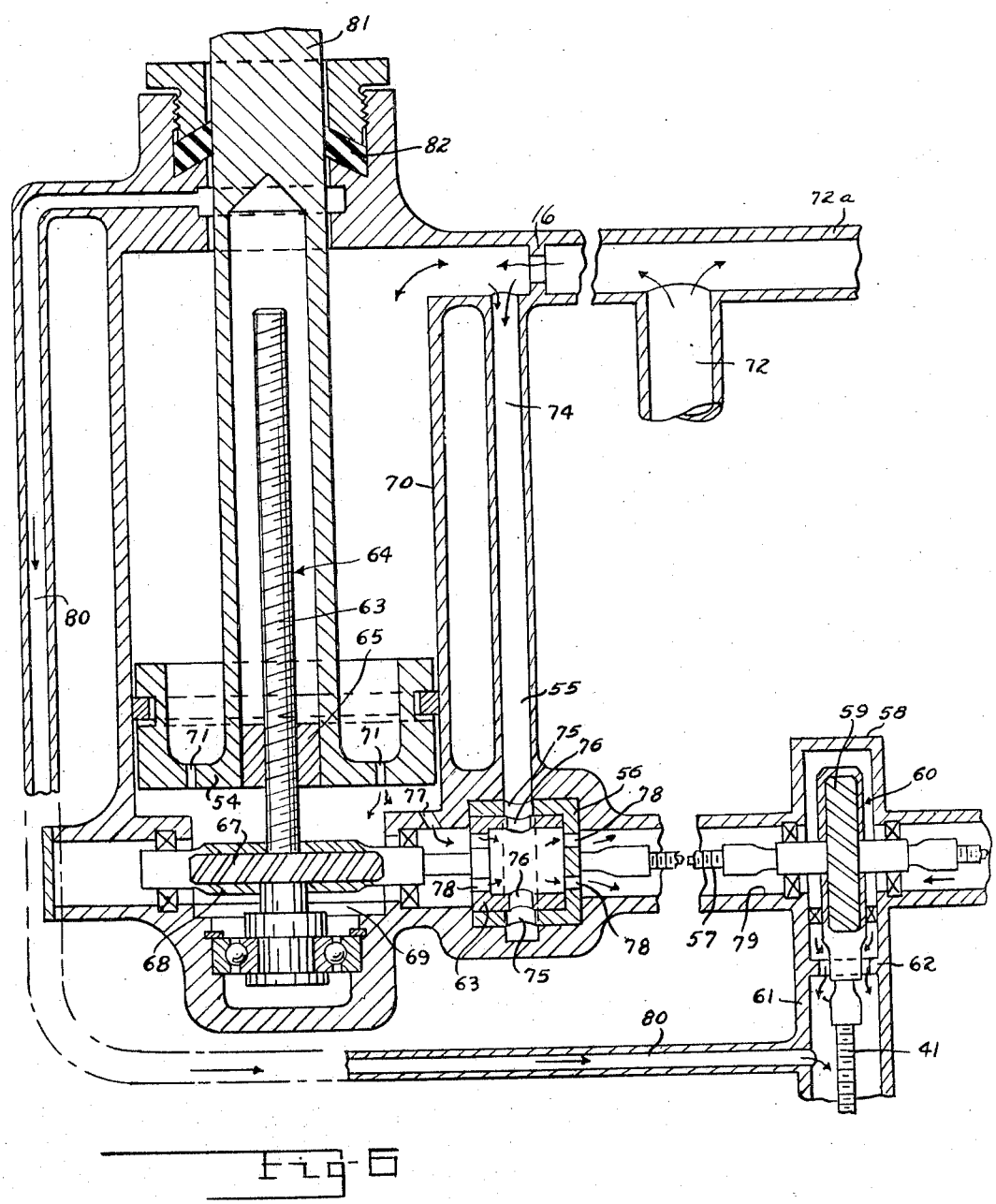
FIG. 6 is an enlarged sectional view, parts being broken away, somewhat like the showing in FIG. 2, but illustrating a modification in the arrangement and location of the variable porting valve means for controlling the opposite pressures on the opposite sides of the piston member.

Referring to the modified arrangement shown in FIG. 6, the control valve which adjusts the differential pressures on opposite sides of the piston 54 is indicated at 53, and instead of being located in the piston it is located in a fluid return port or bypass conduit 55 and is in the form of a rotating sleeve valve having an outer barrel portion 56 which is connected for rotative adjustment or control by the control rod or cable 57 from the main control gear box 58, by the worm wheel 59 adjusted by the worm 60 located in the fluid return passage 61 containing the flow restriction 62 therein similar to the restriction 35 in FIG. 2. The inner barrel 63 is rotated by the actuator piston 54 through the screw feed back stem 63. having the "high pitch" thread 64 threaded through a nut 65 which is fixed in the piston 54, the feed back drive is driven through the worm wheel 67 meshing with a worm 68 which is journalled in the chamber 69 below the cylinder 70. Provision for limited fluid circulation through the piston is provided through the passages 71, affording cooling of the piston.

Pressure fluid from a constant high pressure pump (such as 10) is discharged through the high pressure supply conduit 72 into "header" conduit 72a where it passes flow restriction 73 and into the outer end of the cylinder 70. Pressure fluid is also bypassed through conduit 74 and through the variable openings 75–76 in the control valve structure 53. Part of the pressure fluid flows through the ports 76 and through passage 77 into the rear end of the cylinder 70 providing a variable differential pressure at opposite sides of the piston 54, part of the pressure fluid also circulating through the openings 78, conduit 79, through mechanical control gear box 58, past flow restriction 62 in the lower pressure return conduit 61 back to the supply tanks. The conduit 80 provides for return of high pressure fluid leakage between the actuator piston rod 81 (like rod 8) and outer end of cylinder 70 into low pressure return conduit 61, a pressure fluid seal indicated at 82 being provided for the piston rod 81.

In the operation of this embodiment the pitch of the threads on the screw 63 must necessarily be high. When the main control in the gear box 58 rotates the worm wheel 59, the outer barrel 56 of the valve 53 is adjusted to vary the area through the ports 75 and 76, for instance the fluid return opening area is reduced. Therefore, the relative pressure on the outer side of the piston 54 increases relative to the pressure on the other side of the piston, causing the differential pressure to move the piston 54 and rod 81 inwardly (downwardly in FIG 6).

Since the nut 65 is fixed or integral with the piston 54, the high pitch thread 64 on the screw stem 63 will rotatably adjust the worm wheel 67 which through meshing engagement with the worm 68 rotates the inner barrel 63 to again adjust the openings 75 and 76 to restore the desired pressure balance on opposite sides of the piston 54, like in FIG. 2. By providing an arcuate slot or channel in one of the barrels 56 or 63 with a lug projecting from the other barrel 63 or 56 into the slot, the adjusting cable 57 from the nozzle area control device (such as 42 in FIG. 1) can be employed to positively and mechanically rotate the feed back screw 63 to adjust the position of the piston 54 in the cylinder 70, even upon a failure in the normal working pressure. This constitutes a feed back control between the actuators so that the actuator rods 8 will be simultaneously adjusted in the system under a main single control.

Of course, when it is desired to retract the actuators in FIG. 1 it is only necessary to rotate the worm wheel 27 to reduce the operative area of the port 21 (FIGS. 1 and 2) allowing the pressure above the piston 7 to increase. Movement of the piston 7 displaces the valve 22 relatively to again increase the area of the port 21 and balance the pressures again. With the pressure off or low, rotation of the screw 25 will displace the valve 22 until the lug 22a engages the end (either end) of the slot or channel 23. Thus, there may be provided a mechanical holding force imposed on the actuator rods in the event of total system pressure loss. Further, with the pressurized fluid under continuous circulation the actuators will be cooled, as shown in the drawings.

Some of the advantages of the embodiment shown in FIG. 6 over that shown in FIG. 2, in which the control valve is in the return flow port and is a rotating sleeve valve, is that there is no mechanical interference possible. That is, a sudden violent load on the actuator shaft cannot damage the control mechanism while the disadvantages include much lower circulation and less cooling of the piston structure, and it is not possible to lock the actuator in the event of a hydraulic failure.

In the system schematic shown in FIG. 5, the main fuel control consists of only two hydraulic fuel control lines 14 and 36, the line 36 being substantially a lower pressure line, rather than the conventional actuator devices which employ three lines, supply, return and cooling liquid lines, and an independent main control 41, 38 which is mechanical. Thus, the fluid used to operate the actuators does not have to enter the main control and the control could be electromechanical with only the metering section handling the fluid. Also, since the pump generates only the pressure required to hold the nozzle load, the over-all heat transfer into the fluid will be much less.

The form shown in FIGS. 1 and 2 will automatically lock in the event of loss of hydraulic pressure because the force on the rod 8 cannot rotate the positioning screw 25 due to the low pitch of the threads. The tang 22a on the control valve, the size and strength of the positioning stem or screw 25, and bearing retainer 28 can, therefore, be designed to withstand high compressive loads. It is, of course, necessary to prevent rotation of the pistons 7 (or 54) and rods 8 (or 81) about their axes relative to the threaded stems 25 (or 63). This can be accomplished by suitable splines (not shown) between the rods and the cylinders, although the actuating pivots through the connecting aperture 9 could prevent such relative rotation.

In the system schematic shown in FIG. 1 the cylinders are hydraulically synchronized.

In retracting the cylinders, for example, should the tension load on one actuator rod 8 be higher than on the other three actuator rods 8, the actuator with the higher load will lag the other three. Since the position of all four control valves 22 is the same, the flow area at slot 21 becomes smaller in the lagging actuator. When this condition exists, the constant flow from pump 10 is no longer equally distributed since flow will increase through the three actuators and decrease through the lagging actuator.

The increased flow through the three actuators results in a higher pressure drop across flow restriction 16, thus raising the discharge pressure of pump 10. The smaller flow through the flow restrictor of the lagging actuator allows the pressure in the lagging actuator to approach pump 10 discharge pressure thus, the differential pressure across piston 17 in the lagging actuator becomes higher than the other three forcing piston and rod 8 to move towards the position of the other three.

It is to be understood that the structures illustrated and described herein are illustrative embodiments of the invention and that limited modifications can be made therein without departing from the spirit and scope of the invention as defined by the following claims.

We claim:

1. In a synchronized plural actuator system, a plurality of similar extensible actuators adapted to be connected at one end to a part or parts to be actuated, each actuator comprising a cylinder, a piston reciprocative in said cylinder, an actuator piston rod fixed to said piston and extending out through said end of said cylinder in sealed relation adapted to be connected to said part to be actuated, common high pressure hydraulic fluid supply conduit means connected into each of said cylinders at the actuator rod ends thereof, a constant flow high pressure hydraulic fluid pump connected to said supply conduit means for supplying a uniform high pressure hydraulic constant fluid flow into said supply conduit means, identical fixed area flow restriction means in said conduit means for each cylinder, a flow outlet in the opposite end of each cylinder, a fluid return conduit connecting said flow outlets of all of said cylinders with the inlet side of said pump, a flow restriction in said fluid return conduit having a fixed flow restrictive area for maintaining similar fluid pressures in each of said cylinders between the opposite ends thereof, variable area flow restriction means between the opposite ends of each of said cylinders located between the aforesaid fixed flow restrictions, for varying the relative pressure of the pressure fluid in each cylinder at the opposite sides of the piston therein, mechanical adjusting means connected for simultaneously varying the flow areas of said variable area flow restriction means in all of said cylinders to simultaneously vary the differential pressures at opposite sides of the pistons in all of said cylinders, and means operable by the piston in each cylinder for varying the area of said variable area flow restriction means in predetermined ratio to the relative movement of the pistons in said cylinders responsive to the differential pressures on the opposite sides of said pistons.

2. A synchronized plural actuator system as set forth in claim 1 in which said mechanical adjusting means is enclosed in said fluid return conduit means and includes fluid flow passages between the opposite sides thereof in communication at one side with said pressure fluid supply conduit means and at the other side of the piston with said fluid return conduit means including means for circulating a portion of said hydraulic fluid from said fluid supply conduit means through said pistons to cool the same.

3. In a synchronized fluid pressure actuator system, a plurality of similar extensible actuators adapted to be fixed at one end for extension and retraction, each actuator comprising a cylinder, a piston reciprocable in said cylinder, an actuator piston rod fixed to said piston and extending out of said cylinder through one end thereof in sealed relation, adapted to be connected to a part to be adjusted by said actuators, a constant flow high pressure hydraulic pump, a pressure fluid supply conduit connected between all of said cylinders at the actuator piston rod ends thereof and said pump for supplying hydraulic pressure fluid into all of said cylinders at one side of the pistons therein, a fixed fluid flow restriction between said supply conduit and each of said cylinders having a fixed predetermined restrictive hydraulic fluid flow area for reducing the hydraulic fluid flow into all of said cylinders to a predetermined similar rate of flow, hydraulic fluid return conduit means connecting the other ends of all of said cylinders having a fixed flow restriction therein of predetermined flow area less than the area of the aforesaid fixed flow restriction area for each cylinder, whereby to provide similar hydraulic pressures in all of said cylinders and circulatiton of said pressure fluid through said cylinders, variable area flow restriction valve means in each of said pistons for varying the rate of flow of pressure fluid through said pistons to vary the relative differential pressures in the cylinders at opposite sides of the piston, mechanical means for simultaneously adjusting the variable flow area of the restriction valve means in all of said pistons to change the flow rate through said pistons to vary the differential pressures in said cylinders at opposite sides of said pistons for moving said pistons simultaneously in said cylinders, and follow-up actuating means connected to said pistons for readjusting the flow area of said restriction valve means in proportion to the movement of the pistons to balance the pressures of the hydraulic fluid on opposite sides of the pistons, responsive to said initial variation in the flow area of said restriction valve means by adjustment of said mechanical means, and predetermined movement of said pistons in said cylinders.

4. In a synchronized plural actuator system, a plurality of similar extensible and retractable hydraulic actuators adapted of be fixed at one end and connected at their their other end to a part or parts to be actuated, said actuators each comprising a cylinder having a hydraulic pressure fluid inlet at one end, and a pressure fluid outlet at its opposite end, an actuator piston reciprocable in said cylinder having a piston rod fixed thereto extending out through the pressure fluid inlet end of the cylinder, a pressure fluid circulation port in said piston between said inlet and outlet ports, a variable area flow restriction in said circulation port movable axially in said cylinder relative to said piston for varying the flow area through said piston, common mechanical actuating means connected to all of variable flow restrictions in all of said pistons for simultaneously moving said variable area flow restrictions axially in said cylinders, constant flow hydraulic pump means having an outlet connected to said fluid inlet ports for supplying hydraulic pressure fluid to all of said cylinders, a fixed flow restriction between each of said inlet ports and said pump means for controlling the rate of flow from said pump means into said cylinders, a return flow conduit connecting said fluid outlet ports of said cylinders to the inlet side of said pump means, to provide a continuous pressure fluid circulation through all of said cylinders and pistons, a single fixed area flow restriction between the outlet ports of all of said cylinders and the inlet side of said pump for restricting fluid circulation out of said cylinders to provide predetermined similar pressures in said cylinders at opposite sides of said pistons, said variable area flow restriction including a fixed fluid circulation port through said piston and a closure valve connected to said mechanical actuating means for varying the area of said port in which predetermined follow-up movement of the pistons restores the area to balance the pressures on the opposite sides of the piston and arrest movement of the pistons in the cylinders.

5. An extensible actuator comprising a cylinder, a piston therein, a tubular piston rod closed at its outer end, projecting from said piston through the end of said cylinder in sealed relation, supply conduit means connected for circulating a high pressure fluid into said cylinder at the rod end thereof and return conduit means out of said cylinder at its other end, a fluid circulation port through the wall of said rod adjacent said piston, a flow restriction control valve means in said rod movable axially relative to said piston to vary the area of said circulation port, a fixed flow restriction in said supply conduit means into said cylinder, a second fixed flow restriction in said return conduit means out of said cylinder having a predetermined smaller flow area than the aforesaid fixed restrictive area, whereby to provide a predetermined rate of circulation through said piston and opposing pressures at opposite sides of said piston, an adjusting screw journalled in for rotative adjustment in said cylinder remote from the rod end thereof, threaded through said valve means for shifting said valve means axially in said hollow piston rod relative to said fluid circulation port to vary the flow area thereof, to vary the pressures on the opposite side of said piston, control means for rotating said screw stem, located in said conduit means, whereby axial movement of said valve means varies the flow circulation area in said piston rod relative to said fixed flow restrictions to vary the hydraulic pressures on the opposite sides of the piston to move said piston relative to the position of said valve means, to provide follow-up means for equalizing the opposing circulated pressures to arrest movement of said piston in said cylinder.

6. Apparatus as set forth in claim 5 including means between said valve means and the interior of said piston rod for limiting the axial movement of said valve means in said rod relative to said circulation port, whereby excessive axial movement of said valve means impinges said movement limiting means to move said piston and rod means independently of differential fluid pressures on the opposite sides of the piston, in which is control means encased in said return conduit means.

7. An extensible hydraulic fluid actuator comprising a cylinder having a hydraulic fluid inlet at one end and a fluid outlet at its opposite end, a hydraulic fluid constant flow pump, a fluid supply conduit between the outlet side of the pump and said inlet, a fixed flow restriction in said supply conduit having a predetermined flow area for restricting the rate of flow into said cylinder, a low pressure fluid discharge conduit connected to said fluid outlet of said cylinder, a second fixed flow restriction in said fluid discharge conduit having a fixed different flow restrictive area for circulating a pressure fluid through said cylinder at a predetermined pressure, a piston in said cylinder having a fluid circulating opening therethrough, a hollow piston rod projecting from said piston outwardly through the fluid inlet end of the cylinder in sealed relation having an outer closed end adapted to be connected to a part to be controlled thereby, a screw stem journalled in the base of said cylinder for rotative adjustments while resisting axial movement, said stem having a high pitch thread extending through said piston into said hollow piston rod, a complementary threaded connection between said stem and said piston whereby axial movement of said piston in said cylinder rotates said stem, a bypass fluid pressure conduit around said piston between the opposite ends of the cylinder, variable area fluid circulating valve means in said bypass passage for controlling the rate of flow between the opposite ends of said cylinder, said valve means comprising concentric apertured barrel members having aligned similar fluid circulating ports in the walls thereof, actuating means connected between one of said barrel members and said stem for rotative adjustment thereof in the other barrel member in predetermined ratio to rotation of said stem to vary the relative positions of said ports to vary the fluid flow area therethrough for controlling the rate of flow of hydraulic fluid through said bypass conduit to the opposite side of the piston, and mechanical means connected for adjusting the rotary position of the other concentric barrel member to adjust the effective flow area of the fluid circulating opening in the valve to provide a differential pressure at opposite sides of the piston for moving the piston, whereby relative movement of the piston rotates the stem to restore the flow area of the fluid circulating openings to arrest movement of the piston.

8. In a high pressure hydraulic fluid extensible and retractable actuator device, a constant flow high pressure hydraulic pump having a high pressure outlet and a low pressure inlet, a plurality of cylinders, common high pressure fluid conduit means connecting said high pressure outlet to the outer ends of all of said cylinders, a similar fixed flow restriction of predetermined flow area between said high pressure conduit means and each of said cylinders to similarly retard fluid flow into the cylinders, a low pressure fluid return conduit means between the opposite or inner ends of all of said cylinders and the inlet side of said pump, including an actuator position control means and a hydraulic fluid reservoir tank therein, a common flow restriction having a predetermined fixed flow area located in said return conduit means to provide a predetermined circulating flow through and pressure in all of said cylinders, a threaded similar screw threaded stem journalled axially in the base of each cylinder for rotation, and means preventing axial movement thereof, said stems extending axially in said cylinders from the flow outlet ends thereof toward the flow inlet ends of the cylinders, common adjusting means from said actuator position control device to all of said screw threaded stems for simultaneous identical rotative adjustments of said stems, a similar piston member axially movable in each of said cylinders by differential pressures at opposite sides thereof including a hollow piston rod extending out of the flow inlet end of each cylinder in sealed relation having a cylindrical bore with a closed outer end adapted to be connected to a part to be adjusted by said actuator device, said threaded stem extending axially in the bore of said piston rod, a transverse fluid circulation port of similar flow area and location formed in and through the wall of each of said hollow piston rods adjacent the piston ends thereof to provide predetermined hydraulic fluid circulation through said cylinders and said pistons between said high pressure inlets and low pressure outlets of said cylinders, a cylindrical valve member slidably fitting each of said bores between positions varying the flow area of said fluid circulation ports to vary the differential pressures at opposite sides of said piston members, said valve members each having a complementary threaded opening extending axially therethrough receiving the threaded stems whereby said valve members are simultaneously moved by rotation of said stems to vary said fluid circulation openings, means between said valve members and said piston rods to prevent relative rotation therebetween and limiting relative axial movement between said valves and said pistons, whereby rotation of said stems adjusts the valve members to vary the circulation area through the pistons, and resulting movement of said pistons shifts the positions of the circulation ports relative to the valve members to reduce the circulation areas to arrest further movement of said pistons.

9. An extensible, retractable actuator comprising a cylinder having a pressure fluid inlet port at one end and a fluid output conduit at its opposite end, a fixed flow restriction in said inlet port for controling the rate of flow of a pressure fluid into said inlet port, a flow restriction of smaller flow area in said outlet conduit to provide a predetermined rate of flow of a pressure fluid through said cylinder, a piston member having a piston rod therefrom extending out through the inlet port end of said cylinder in sealed relation, said piston and rod having an axial bore opening through the base side of the piston and extending in said piston rod substantially the length of the cylinder, said rod having a restricted fluid circulation opening into said bore adjacent said piston, a cylindrical valve axially movable in said bore to vary the area of said circulation opening having a threaded bore therethrough, a threaded screw stem rotatably journalled in the base of said cylinder in threaded engagement with said valve for moving said valve axially in said bore to vary the area of said fluid circulating flow opening, and mechanical adjusting means for rotating said stem to adjust said valve axially in said bore in which said mechanical adjusting means is disposed in said outlet conduit, and includes means between said valve and said piston for limiting the relative axial movement of said valve in said bore by said stem in either direction, and preventing rotary movement of said valve means in said bore relative to said piston.

10. A hydraulic actuator comprising a cylinder, piston means movable axially therein including a piston rod adapted to be connected to a part to be actuated, a high pressure constant flow hydraulic pump, hydraulic pressure fluid supply conduit means connecting the outlet side of said pump to the piston rod end of said cylinder, low pressure fluid return conduit means connecting the opposite end of said cylinder to the inlet side of said pump to provide a continuous circulation of said pressure fluid through said cylinder, said piston means having a variable area fluid circulation port therethrough in communication between the opposite ends of the cylinder, valve means axially movable in said piston means to vary the effective area of said fluid circulation port, mechanical adjusting means fixed in said cylinder in connected actuating relation to said valve means for axially adjusting said valve means in said piston means to vary the effective flow area of said fluid circulation port, a fixed area flow restriction in said supply conduit for controlling the relative rate of flow of said pressure fluid into said cylinder, a second fixed area flow restriction in said fluid return conduit having a smaller flow area than the aforesaid fixed area flow restriction to provide predetermined fluid pressure in said cylinder at opposite sides of said piston, whereby adjustment of said variable area valve means in said piston varies the differential pressures at opposite sides of said piston to move the same in said cylinder, and movement of said piston means in said cylinder relative to said valve means provides a follow-up adjustment of said valve means to restore a predetermined balance in fluid pressure in said cylinder at opposite sides of the piston means to arrest relative movement of said piston means in said cylinder, in which said piston includes a piston rod having a cylindrical bore opening through said piston, and said circulation port is formed in said rod adjacent said piston, and comprises an elongated slot perpendicular to the axis of the rod opening into said bore, and said valve means comprises a cylindrical member slidably fitting said bore having an axially threaded opening therethrough and is axially movable in said bore to vary the operative area of said slot, and said mechanical means comprises a screw threaded stem member threaded through said threaded opening in said valve means for adjusting the valve means axially in said bore incident to rotation of said stem, in which said stem is journalled in the base of said cylinder for rotative movement in said cylinder and prevented from axial movement, and includes means for rotating said stem to adjust the axial position of said valve means in said cylinder, and means to prevent rotation of said valve means in said bore and limit axial movement of said valve means in said bore to prevent closure of said circulation port by said valve means.

References Cited by the Examiner

UNITED STATES PATENTS

| | | | |
|---|---|---|---|
| 1,921,590 | 8/1933 | Staude | 91—49 |
| 2,496,369 | 2/1950 | Baghuis | 91—380 |

FOREIGN PATENTS

| | | |
|---|---|---|
| 741,199 | 9/1943 | Germany. |
| 1,117,008 | 5/1956 | France. |

EDGAR W. GEOGHEGAN, *Primary Examiner.*

MARTIN P. SCHWADRON, *Examiner.*

P. T. COBRIN, P. E. MASLOUSKY, *Assistant Examiners.*